US012783499B1

(12) United States Patent
Alyahya et al.

(10) Patent No.: US 12,783,499 B1
(45) Date of Patent: Nov. 3, 2026

(54) SYSTEMS AND METHODS FOR GENERATING A RESPONSE PROTOCOL FOR A NATURAL LANGUAGE QUERY

(71) Applicant: Saudi Technology and Security Comprehensive Control Co. Ltd., Riyadh (SA)

(72) Inventors: Tasniem Nasser Alyahya, Riyadh (SA); Areej Turky Alotaibi, Riyadh (SA); Layali Abdulrahman Alsolami, Riyadh (SA)

(73) Assignee: Saudi Technology and Security Comprehensive Control Co. Ltd., Riyadh (SA)

( * ) Notice: Subject to any disclaimer, the term of this patent is extended or adjusted under 35 U.S.C. 154(b) by 0 days.

(21) Appl. No.: 19/563,976

(22) Filed: Mar. 11, 2026

(51) Int. Cl.
*G06F 16/23* (2019.01)
*G06F 16/248* (2019.01)
*G06F 16/28* (2019.01)

(52) U.S. Cl.
CPC ........ *G06F 16/2365* (2019.01); *G06F 16/248* (2019.01); *G06F 16/285* (2019.01)

(58) Field of Classification Search
CPC ............... G06F 16/215; G06F 16/2365; G06F 16/243; G06F 16/24542; G06F 16/248; G06F 16/285; G06F 16/338; G06F 16/345; G06F 16/90332; G06F 16/9038; G06F 16/9538; G06F 40/30; G06F 40/40; G06F 11/3409; G06F 11/3698; G06N 20/00;
(Continued)

(56) References Cited

U.S. PATENT DOCUMENTS

| | | | | |
|---|---|---|---|---|
| 12,639,295 | B1 * | 5/2026 | Navarro | G06F 16/243 |
| 2020/0081939 | A1 * | 3/2020 | Subramaniam | G06F 16/90332 |
| 2023/0419652 | A1 * | 12/2023 | Tiong | G06N 3/045 |

(Continued)

OTHER PUBLICATIONS

Brodimas et al, 'Intent-Based Infrastructure and Service Orchestration Using Agentic-AI', in IEEE Open Journal of the Communications Society, vol. 6, pp. 7150-7168, 2025 (Year: 2025).*

*Primary Examiner* — Amy Ng
*Assistant Examiner* — Cheryl M Shechtman
(74) *Attorney, Agent, or Firm* — Baker & McKenzie LLP

(57) ABSTRACT

The disclosed methods and systems relate to generating and implementing a response protocol associated with a query. In one embodiment, an input query is received by a deterministic or semi-deterministic intelligent computing system. Based on the query, the system determines slots data indicating semantic intent, generates operands, and defines a data scope for the data processing request. An execution mode is selected, and a hybrid response protocol is generated using a structured or semi-structured data exchange format that preserves governance and execution-integrity properties. The system validates the hybrid response protocol, produces intermediate output data, and curates the intermediate output data to determine its accuracy. Quantitative transformation or logical evaluation operations are then performed to generate evaluation data, followed by numerical consistency or compliance operations to generate verified output data. The verified output data is transformed into natural language output and is visualized with evidence and verification identifiers.

20 Claims, 6 Drawing Sheets

(58) Field of Classification Search
CPC ............ G06N 3/08; G06N 3/09; G06N 5/025; G06N 5/04
See application file for complete search history.

(56) References Cited

U.S. PATENT DOCUMENTS

| | | | | |
|---|---|---|---|---|
| 2024/0070434 | A1 * | 2/2024 | Garg ................... | G06F 16/3344 |
| 2026/0134043 | A1 * | 5/2026 | Zwicky ............... | G06F 16/9535 |
| 2026/0134398 | A1 * | 5/2026 | Raj .................... | G06Q 10/1053 |

* cited by examiner

SYSTEMS AND METHODS FOR GENERATING A RESPONSE PROTOCOL FOR A NATURAL LANGUAGE QUERY

TECHNICAL FIELD

The present disclosure relates to intelligent computing systems for data processing.

BACKGROUND

There is a need to reliably and consistently analyze data inputs to accurately access structured, semi-structured, or unstructured data, while addressing data challenges.

SUMMARY

The disclosed methods and systems are directed to generating and implementing a response protocol associated with a query (e.g., an input data query or simply "input query"). According to one embodiment, a method for generating and implementing a response protocol associated with a query comprises: receiving, using one or more computing device processors associated with a deterministic or semi-deterministic intelligent computing system, an input query from an input device, the input query comprising a natural language input associated with a data processing request; determining, using the one or more computing device processors associated with the deterministic or semi-deterministic intelligent computing system, based on the input query, slots data indicating a semantic intent associated with the data processing request; generating, using the one or more computing device processors associated with the deterministic or semi-deterministic intelligent computing system, based on the slots data, one or more operands associated with the data processing request; defining, using the one or more computing device processors associated with the deterministic or semi-deterministic intelligent computing system, based on the one or more operands, a data scope for the data processing request; determining, using the one or more computing device processors associated with the deterministic or semi-deterministic intelligent computing system, based on the data scope, an execution mode for the data processing request, the execution mode comprising one or more computing languages for executing the data processing request; generating, using the one or more computing device processors associated with the deterministic or semi-deterministic intelligent computing system, based on at least the execution mode for the data processing request, a hybrid response protocol having a structured or semi-structured data exchange format configured to preserve governance, validation, and execution integrity properties of the hybrid response protocol; validating, using the one or more computing device processors associated with the deterministic or semi-deterministic intelligent computing system, based on the data exchange format, the hybrid response protocol, thereby generating a validated response protocol, the validated response protocol comprising at least the slots data and the one or more operands; generating, using the one or more computing device processors associated with the deterministic or semi-deterministic intelligent computing system, based on the validated response protocol, intermediate output data associated with the data processing request; curating, using the one or more computing device processors associated with the deterministic or semi-deterministic intelligent computing system, the intermediate output data thereby determining an accuracy of the intermediate output data; performing, using the one or more computing device processors associated with the deterministic or semi-deterministic intelligent computing system, based on the curating, one or more of quantitative transformation computing operations or structural or logical evaluation computing operations on at least the intermediate output data, thereby generating evaluation data associated with the intermediate output data; implementing, using the one or more computing device processors associated with the deterministic or semi-deterministic intelligent computing system, one or more of a numerical consistency computing operation and a compliance computing operation on the evaluation data thereby generating verified output data; transforming, using the one or more computing device processors associated with the deterministic or semi-deterministic intelligent computing system, the verified output data into one or more of natural language output data and provenance package data, the provenance package data being configured to link the natural language output data to an evidence identifier associated with the verified output data; implementing, using the one or more computing device processors associated with the deterministic or semi-deterministic intelligent computing system, at least one of: an archiving computing operation that stores data artifacts associated with the validated response protocol, a governance computing operation that generates a performance metric associated with the validated response protocol, and an annotation computing operation, based on at least the archiving computing operation or the governance computing operation that generates a performance metric associated with the verified output data, and initiating visualizing, using the one or more computing device processors associated with the deterministic or semi-deterministic intelligent computing system, based on the provenance package data, the natural language output data, wherein the visualizing comprises rendering, on a display computing device, answer text in response to the input query, the answer text being linked to one or more of the evidence identifier, a computation-trace identifier, and verification metadata.

In other embodiments, a system and a computer program product can include or execute the method described above. These and other implementations may each optionally include one or more of the following features.

According to one embodiment, the deterministic or semi-deterministic intelligent computing system is configured to implement one or more of: a rule-based computing operation associated with generating or implementing the validated response protocol; a zero-temperature large language intelligence computing model configured to implement at least one constrained execution computing operation associated with generating or implementing the validated response protocol; a symbolic computing operation associated with generating or implementing the validated response protocol; a deterministic or semi-deterministic governance computing operation associated with generating or implementing the validated response protocol; and a reconciliation, veto, or blocking behavior computing operation associated with generating or implementing the validated response protocol.

It is appreciated that the input query comprises context data on which at least the slots data is based, the context data comprising at least one of: organizational-scope data associated with the data processing request; scenario data associated with the one or more operands; and first temporal data associated with a time window for which the slots data is determined.

It is further appreciated that the slots data indicates or is associated with at least one of: domain data indicating an organizational unit associated with the data processing request; metric data indicating a qualitative or a quantitative attribute associated with the data processing request; second temporal data for determining the slots data; and operation-type data associated with at least one computing operation associated with the data processing request.

In some implementations, the operation-type data comprises at least one of: a variance computing operation associated with the data processing request that determines difference data between two or more data values associated with the one or more operands; an anomaly-detection computing operation associated with the data processing request that identifies a deviation from one or more threshold data associated with the one or more operands; a lookup computing operation associated with the data processing request that retrieves a data value associated with the one or more operands; a trend-analysis computing operation that identifies change across data values; a ratio computing operation associated the data processing request that generates relationship data between two or more data values associated with the one or more operands; an aggregation computing operation associated with the data processing request that combines a two or more data values into a consolidated value associated with the one or more operands; a threshold-evaluation computing operation associated with the data processing request that determines whether at least one data value satisfies a predefined logical or numerical condition associated with the one or more operands; a correlation computing operation associated with the data processing request that determines a dependency or association between two or more data variables associated with the one or more operands; a classification computing operation associated with the data processing request that assigns one or more data values to at least one data category based on one or more rules associated with the one or more operands; and a normalization computing operation that transforms homogeneous or heterogeneous data values into a scalar data value associated with the one or more operands.

Additionally, at least one of: the variance computing operation is deterministically executed in accordance with a first validated data scope and is bound to the one or more operands such that the verified output data is: traceable to a structured data source, reproducible upon re-execution, and subject to verification prior to authorizing use of the verified output data; the anomaly-detection computing operation is deterministically executed in accordance with a second validated data scope and is bound to the one or more operands such that the verified output data is: traceable to the structured data source, reproducible upon re-execution, and subject to verification prior to authorizing use of the verified output data; the lookup computing operation is deterministically executed in accordance with a third validated data scope and is bound to the one or more operands such that the verified output data is: traceable to the structured data source, reproducible upon re-execution, and subject to verification prior to authorizing use of the verified output data; and the trend-analysis computing operation is deterministically executed in accordance with a fourth validated data scope and is bound to the one or more operands such that the verified output data is traceable to the structured data source, reproducible upon re-execution, and subject to verification prior to authorizing use of the verified output data.

According to one embodiment, the one or more operands comprise at least one of: sheet data indicating a structured data source from which one or more data values for the data processing request are retrievable; and filter data indicating one or more selection constraints for identifying a subset of the structured data source associated with the data processing request. It is appreciated that the sheet data comprises at least one of a record data sheet, an aggregated-value data sheet, or a rule-definition data sheet; and the filter data comprises at least one selection constraint including a temporal constraint, an attribute-type constraint, or a domain-classification constraint.

In exemplary implementations, the data scope comprises at least one of: sheet data indicating a structured data source from which data associated with the data processing request is retrievable; and filter data indicating one or more selection constraints for identifying a subset of the structured data source; and the data scope, once validated, constrains downstream retrieval and computation unless modified through a revalidation process.

According to one embodiment, the hybrid response protocol comprises: a first response protocol configured for a row-level programmatic computing operation; and a second response protocol configured for an aggregation or a join-based computing operation.

Moreover, the numerical consistency computing operation or the compliance computing operation comprises implementing one or more of: a reconciliation computing operation to determine a delta data value associated with the evaluation data; a policy check computing operation, based on the delta data value, to determine flags data associated with the evaluation data; and an assessment computing operation associated with the policy check computing operation, based on the flags data, to determine whether to block or allow the verified output data.

Furthermore, the above method can further comprise implementing, prior to generating the verified output data, a coherence or evidence alignment computing operation on the evaluation data to enforce logical consistency across the intermediate output data.

BRIEF DESCRIPTION OF DRAWINGS

The disclosure is illustrated by way of example, and not by way of limitation in the figures of the accompanying drawings in which like reference numerals are used to refer to similar elements. It is emphasized that various features may not be drawn to scale, and the dimensions of various features may be arbitrarily increased or reduced for clarity of discussion.

DETAILED DESCRIPTION

Reference will now be made in detail to embodiments, examples of which are illustrated in the accompanying drawings and figures. In the following detailed description, numerous specific details are set forth in order to provide a thorough understanding of the disclosed subject-matter. However, it will be apparent to one of ordinary skill in the art that the methods and systems disclosed may be practiced without these specific details.

As used herein, the term “exemplary” or “illustrative” means “serving as an example, an instance, or an illustration." Any implementation described herein as exemplary or illustrative is not necessarily to be construed as advantageous and/or preferred over other embodiments. Unless the context requires otherwise, throughout the description and the claims, the word "comprise" and variations thereof, such as "comprises" and "comprising" are to be construed in an open, inclusive sense, i.e., as "including, but not limited to."

Network Environment

Figure 1:
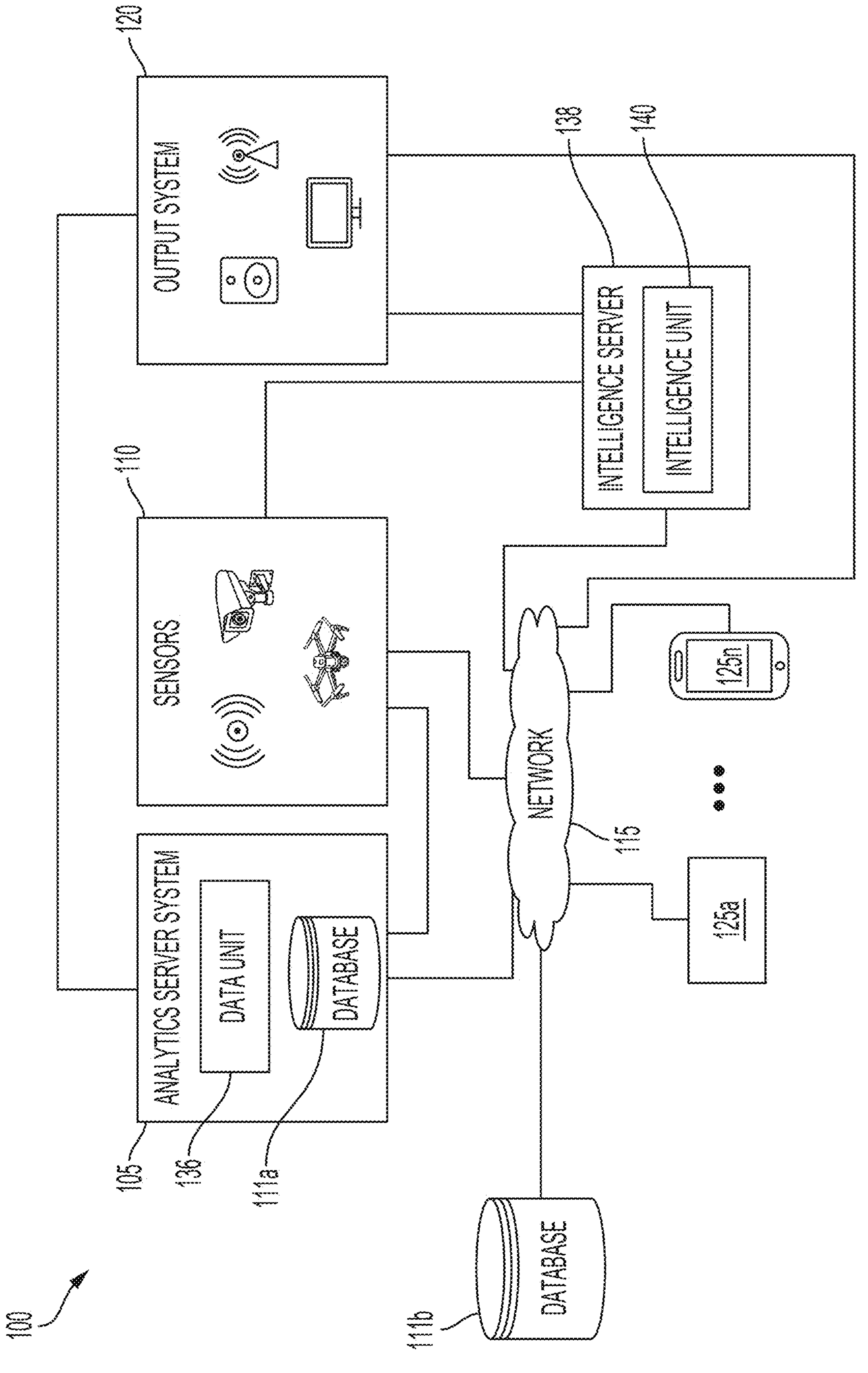
FIG. 1 shows an exemplary network system for executing the principles disclosed.

Shown in FIG. 1 is an exemplary network system 100 for executing the principles disclosed. Specifically, the exemplary network system 100 may be used to implement dynamic analysis of structured and/or unstructured documents or data. In the illustrated implementation, the network system 100 includes an analytics server system 105, one or more sensors 110, one or more computing databases 111*a* and 111*b*, and one or more output system 120, all of which are communicatively coupled to a network 115. Also connected to the network 115 are one or more endpoint devices 125*a* . . . 125*n* and an intelligence server 138.

It is appreciated that the implementation of the analytics server system 105 and/or the intelligence server 138 may be physically structured in various configurations. In one embodiment, the one or more computing device processors that execute the functions of the analytics server system 105 and/or the intelligence server 138 may be co-located at a single geographical location or housed within a single data center. Alternatively, the one or more computing device processors that execute the functions of the analytics server system 105 and/or the intelligence server 138 may be realized in a distributed computing environment, where multiple computing device processors are spread across disparate physical locations and are communicatively coupled over a network to operate in a coordinated or parallel fashion.

According to one embodiment, the analytics server system 105 includes a computing device such as a content server, a communication server, a laptop computer, a desktop computer, a handheld computing device, a tablet computing device, a virtual machine, a cloud-based computing system and/or a cloud-based service, and/or the like. The analytics server system 105 may include a plurality of computing devices configured to communicate with one another and/or communicate with other systems comprised in the network system 100 to implement the techniques described herein.

According to one embodiment, the analytics server system 105 comprises a data unit 136 (also referred to as one or more data units elsewhere herein) and at least one local computing database 111*a*. For example, results from implementing the disclosed urban intelligence methods may be stored in the local computing database 111*a* or in a remote computing database 111*b* that is physically distal (e.g., implemented in a first location that is different from a second location where the local computing database 111*a* is implemented). According to one embodiment, the local computing database 111*a* and the remote computing database 111*b* may include a non-volatile memory or similar permanent storage device and media. For example, the local computing database 111*a* and the remote computing database 111*b* can be a hard disk drive, a CD-ROM device, a DVD-ROM device, a DVD-RAM device, a DVD-RW device, a flash memory device, solid state media, or some other mass storage device known in the art for storing information on a more permanent basis.

Figure 2:
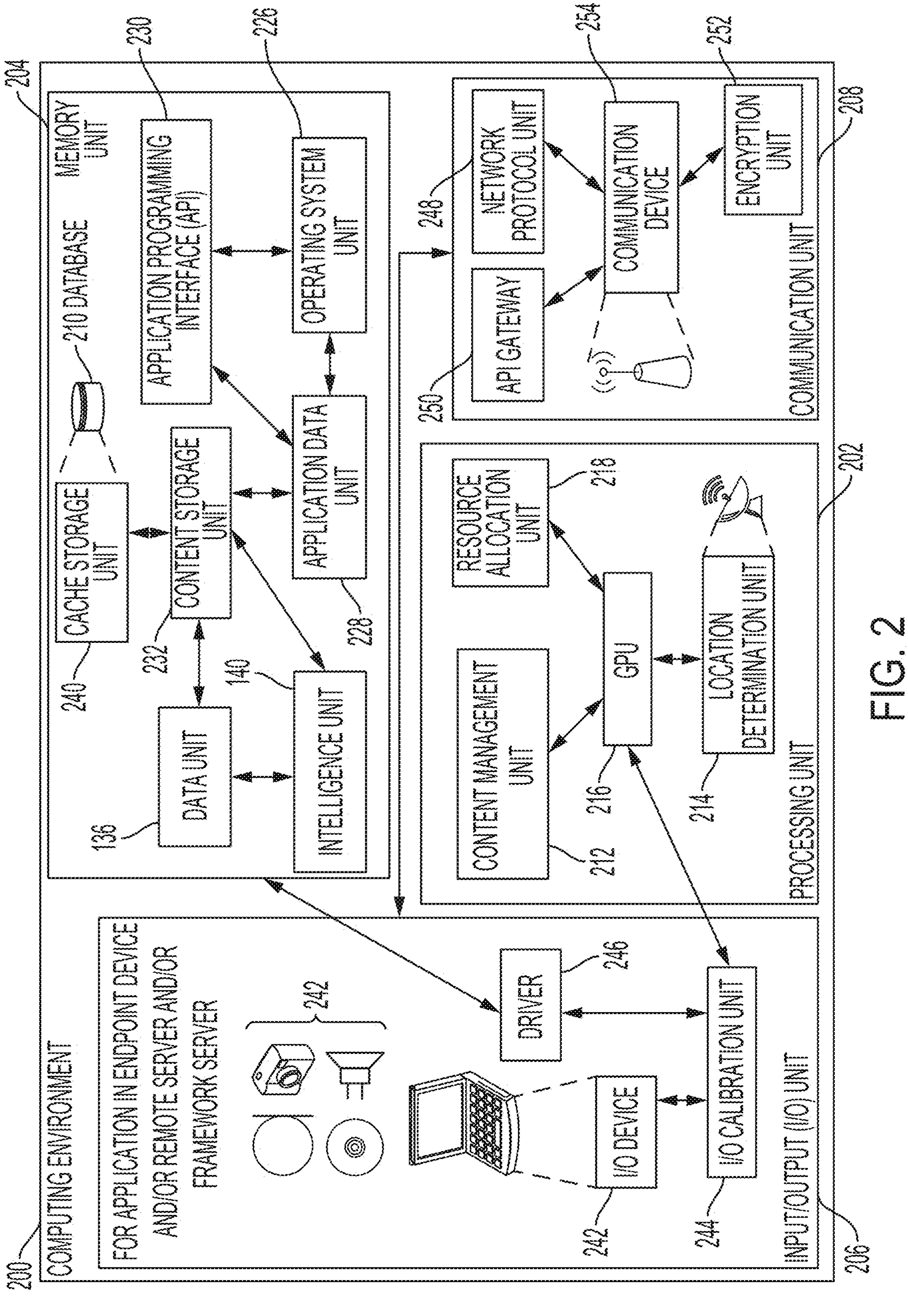
FIGS. 2 and 3 illustrate exemplary system and functional diagrams of a computing environment, within which one or more systems shown in FIG. 1 can be implemented.
Figure 3:
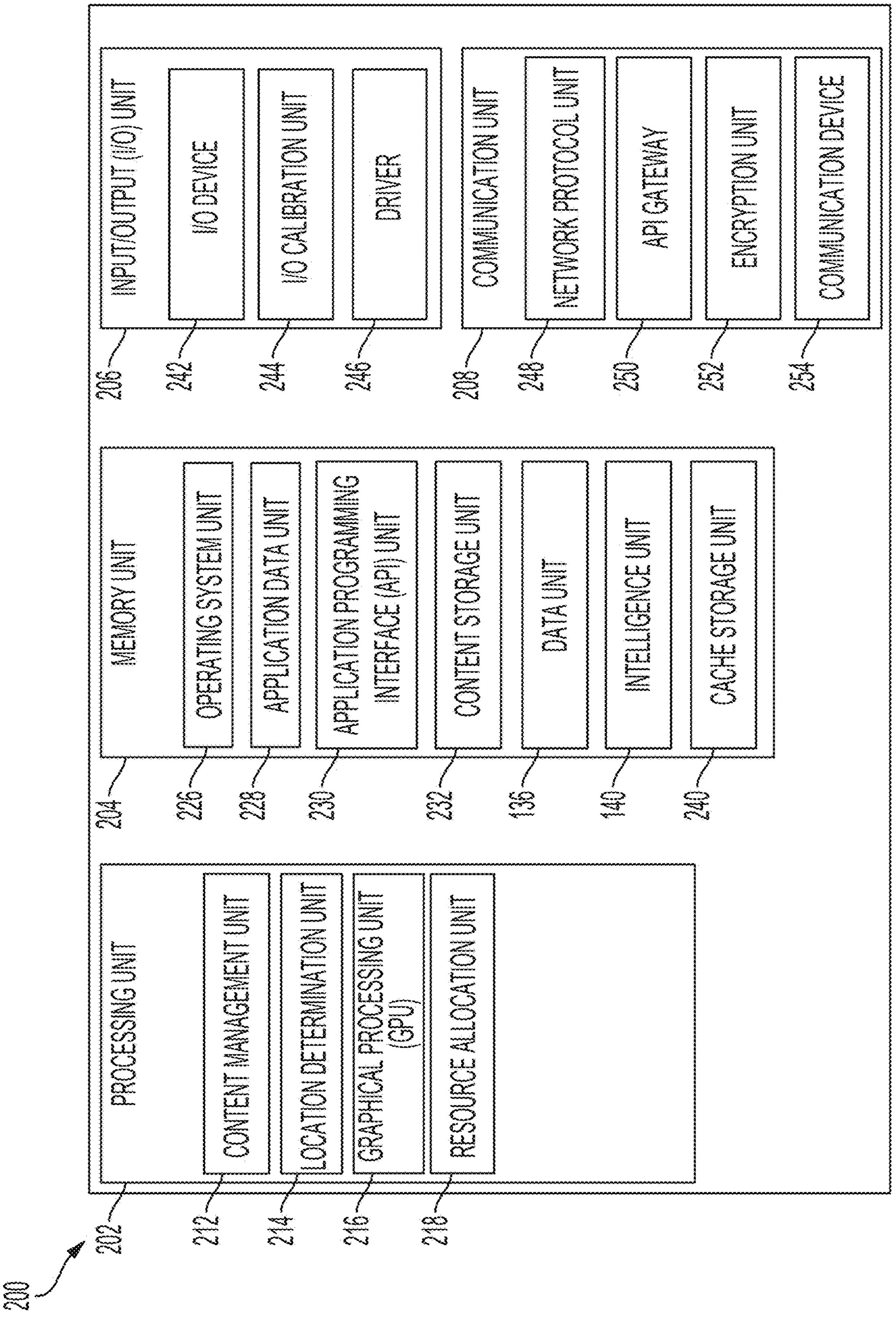

The data unit 136 referenced above may include one or more instructions or computer logic that are executed by the one or more processors such as the processors discussed in association with FIGS. 2 and 3. The data unit 136 referenced herein comprises an executable software module containing one or more instructions or computer-executable logic. These instructions are specifically configured to be executed by one or more processors, such as the processors discussed in association with FIGS. 2 and 3, to perform the disclosed method. In particular, upon execution by said processors, the instructions within the data unit 136 cause a computing system to carry out the specific processing procedures, methods, techniques, and workflows provided in this disclosure. Thus, the data unit 136 represents a tangible software implementation that directs a computing device to function as a specialized machine for executing the disclosed method.

The analytics server system 105 may be configured to communicate with the one or more systems coupled to the network 115. In addition, this communication can involve the transmission of one or more alerts from the analytics server system 105 to the one or more endpoint devices 125*a* . . . 125*n*.

According to one embodiment, the analytics server system 105 can be coupled, via the network 115, to an intelligence server 138 configured to control or regulate, in conjunction with, or independent of the data unit 136, training of one or more computing models configured for implementing inference data computing operations and/or object identification computing operations. In some cases, the intelligence server 138 can comprise one or more intelligence units 140 that can implement computing operations such as: zero-shot learning computing operations, few-shot learning computing operations, and result/model fine-tuning computing operations. Additionally, or alternatively, one or more artificial intelligence (AI) models and/or machine learning (ML) models may comprise, or be based on at least one of: GPT-4, LLAMA-3, BLOOM, PaLM, GPT-3.5, BERT, Gemini, LaMDA, Perplexity, or Falcon. Additionally, or alternatively, one or more of the AI or ML models may also include multiple intelligence models and therefore may be configured to perform and/or execute multiple processes in parallel. In addition, the AI or ML models disclosed may include various artificial intelligence systems or structures, including but not limited to large language models (LLMs), deep learning models, machine learning models, neural networks (e.g., convolutional neural networks (CNNs), recurrent neural networks (RNNs), transformers), expert systems, decision trees, and reinforcement learning models.

Additionally, or alternatively, one or more of the AI/ML models may also include multiple intelligence models (e.g., separately trained intelligence models) and therefore may be configured to perform and/or execute multiple processes in parallel. In some embodiments, the intelligence server 138 may include a special chipset for processing large amounts of data and/or complex computing operations in a reduced amount of time. These chipsets may include, but are not limited to, Graphics Processing Units (GPUs), Tensor Processing Units (TPUs), Field-Programmable Gate Arrays (FPGAs), Application-Specific Integrated Circuits (ASICs) specifically designed for artificial intelligence (AI) workloads, or neuromorphic chips. Such chipsets can be configured to have parallel computing architectures, enabling efficient execution of matrix multiplications and convolutions, which comprise computing operations in a given intelligence model, particularly deep learning models. This parallel processing capability can allow for rapid ingestion, analysis, and processing of vast datasets, thereby accelerating model training, inference, and overall performance of the intelligence server 138 and/or analytics server system 105. The chipsets referenced herein may further incorporate dedicated memory architectures (e.g., High Bandwidth Memory (HBM)) optimized for the data throughput requirements of large intelligence models.

In some embodiments, the intelligence unit 140, or components thereof, may be implemented and/or deployed on dedicated hardware accelerators embedded within a system-on-chip (SoC) or as discrete integrated circuits. These hardware implementations can facilitate high-speed data processing and low-latency inference, needed for document applications such as analyzing document data. Furthermore, the intelligence server 138, or components thereof, including specialized chipsets and intelligence models, may be provided by a third-party vendor or service provider (e.g., via cloud-based AI/ML platforms) or may be developed and maintained in-house.

Once captured by the one or more sensors 110, the document data may be transmitted to the analytics server system 105 and/or to the intelligence server 138 for processing. The analytics server system 105, acting as a central hub, can orchestrate the analysis of the data, while the intelligence server, powered by advanced AI and ML computing processes, performs the computationally intensive tasks.

In some embodiments, the one or more sensors 110 are configured to acquire structured and unstructured data objects derived from digital or physical documents, including but not limited to scanned document images, machine-readable files, tabular data extracts, schema-bound CSV files, multi-sheet workbook files, XML-based and JSON-based structured records, form-based data entries, PDF files, text-encoded value tables, metadata-embedded reports, semi-structured logs, index-linked value columns, and any combination thereof. The one or more sensors 110 may include document-capture systems, optical scanners, character-recognition subsystems, file-ingest modules, or application interfaces that detect, receive, or convert such document or file content into digitally encoded data units suitable for computational processing.

In some embodiments, the analytics server system 105 receives the captured document-derived or file-derived data objects (e.g., structured and/or unstructured data objects) over the network 115 and performs conditioning operations including document parsing, optical character recognition, field extraction, schema normalization, identifier resolution, cell-level value mapping, table segmentation, semantic labeling, and feature derivation. The resulting conditioned data objects may comprise record-level arrays, aggregated-value structures, mapping tables, reference structures, attribute-value matrices, temporal-index tables, cross-sheet correspondence structures, or rule-definition structures. These conditioned data objects may be stored in the local database 111*a* or the remote database 111*b*, each database being configured to retain persistent structured data records and computation-ready value objects.

In some embodiments, databases 111*a* and 111*b* maintain multi-modal data structures that can be mined during operand construction and data-scope definition. Such structures may include database tables representing category-value relationships; columnar value sets derived from multi-sheet workbooks; index-qualified value rows extracted from structured documents; rule structures containing threshold parameters or logical conditions; reference tables containing canonical identifiers; joined or fused data matrices; or curated value sets generated by earlier processing stages. Each data structure may be associated with sheet identifiers, row identifiers, cell identifiers, metadata labels, or provenance indicators enabling downstream retrieval, filtering, and cross-validation operations consistent with the validated response protocol.

In some embodiments, one or more endpoint devices 125*a*-125*n* transmit query data objects to the analytics server system 105 via network 115. The query data may include natural language input requesting retrieval or computation over the structured data sources stored in databases 111*a* and 111*b*; structured prompts referencing file-based or document-based data sources; or instructions to analyze, compare, merge, or transform values encoded in the stored data structures. Upon receiving such queries, the analytics server system 105 may extract slots data, construct operands defining sheet and filter data, and apply the validated data scope to confine retrieval to the appropriate data structures stored within databases 111*a* or 111*b*. Results, visualizations, and provenance-linked answer objects may be transmitted back to the endpoint devices 125*a*-125*n* for presentation or further interaction.

In some embodiments, the conditioned document-derived or file-derived data stored in databases 111*a* and 111*b* is used to generate one or more operands associated with a query. Each operand identifies a structured data source within the stored document corpus-such as a sheet-like structure, table region, record set, or rule table- and one or more filter constraints specifying which rows, columns, value ranges, or attribute combinations correspond to the data processing request. The analytics server system 105 applies the validated data scope to constrain retrieval and computation such that all numerical or logical operations, including variance analysis, anomaly detection, lookup operations, ratio computations, aggregations, and other transformations recited in the claims, are performed only on the subset of data objects explicitly permitted by the validated response protocol. This ensures that downstream computation is traceable to specific document-derived or file-derived data units stored in database 111*a* or 111*b*.

In some embodiments, the one or more sensors 110 are configured to acquire data from diverse domains such that the acquired data is structured, semi-structured, or unstructured. The analytics server system 105 may condition the captured content (for example, by parsing, normalization, or schema alignment) and persist the resulting records in database 111*a* and/or database 111*b*, thereby enabling a consistent representation of document-derived, signal-derived, or telemetry-derived inputs that can be operated on by the disclosed techniques.

In some embodiments, this data-agnostic approach allows the disclosed systems and methods to support urban and non-urban data analysis without limiting the disclosed technology to any single domain. Whether operating over telemetry or records within a database management context, the one or more sensors 110 and the analytics server system 105 cooperate to transform incoming content into governed, traceable artifacts that the disclosed data processing pipeline can analyze-preserving the validated data scope, enabling verification prior to use, and producing visualization linked to evidence identifiers, computation-trace identifiers, and verification metadata.

It is appreciated that the one or more endpoint devices 125*a* . . . 125*n* can comprise handheld computing devices, smart phones, tablets, phablets, laptop computers, desktop computers, personal digital assistants (PDAs), smart devices, wearable electronic devices, biometric devices, computer servers, virtual servers, virtual machines 2, and/or communication servers. In some embodiments, the one or more endpoint devices 125*a* . . . 125*n* may include a plurality of computing devices configured to communicate with one another and/or receive/transmit data communications from/to the analytics server system 105 and/or the intelligence server 138. In some instances, one or more alert data communications (e.g., the aforementioned alerts) associated with executing one or more of the disclosed methods may be visualized on one or more display devices of the one or more endpoint devices 125*a* . . . 125*n*. In some cases, the one or more endpoint devices comprise a first endpoint device that is associated with the analytics server system 105. This first endpoint device, for example, can comprise an admin endpoint device configured to monitor, control, or otherwise regulate or validate various computing operations implemented in the network system 100. Furthermore, the one or more endpoint devices 125*a* . . . 125*n* can include a second endpoint device that may be dependent or independent from the analytics server system 105. It is also appreciated that the one or more endpoint devices 125*a* . . . 125*n* may include and/or are associated with the one or more sensors 110.

The output system 120 of FIG. 1, is adaptable to interface with, and drives one or more sensor interfaces using data or control logic that may be either dependent on or independent of the computing operations performed by the disclosed methods and systems. For example, the output system 120 may incorporate a visual subsystem, such as a graphical display device including but not limited to liquid crystal displays (LCDs), light-emitting diode (LED) displays, organic light-emitting diode (OLED) displays, or touch-screen interfaces, configured to render data alerts, notifications, graphical representations, or other electronic indicia derived from or responsive to the outcomes of the disclosed computing operations. Additionally, the output system 120 may integrate an audio subsystem, exemplified by speakers, transducers, or audio amplifiers, capable of generating audio data such as tones, voice prompts, or synthesized speech in response to input data or control logic stemming from, or independent of the disclosed methods. Furthermore, the output system 120 can encompass vibration-based mechanisms, such as eccentric rotating mass (ERM) motors or linear resonant actuators (LRAs), embedded within various apparatuses including automotive steering wheels, handheld mobile computing devices, wearable electronic watches, or tablet computing devices, to deliver tactile alerts or feedback patterns triggered by processed data or logic resulting from one or more of the disclosed methods.

In some embodiments, the output system 120 is configured to activate a haptic feedback subsystem, employing vibration sensors, piezoelectric elements, or similar haptic actuators to provide nuanced tactile sensations, such as variable intensity vibrations or directional cues, in response to data or control logic generated post-execution of one or more of disclosed methods. Moreover, the output system 120 may include embedded control logic designed to regulate environmental conditioning systems, thereby modulating parameters like ambient temperature via heating or cooling elements, atmospheric pressure through pressurization valves or compressors, or humidity levels using humidifiers, dehumidifiers, or evaporative systems, all in accordance with the computational results or directives associated with the disclosed methods and systems. Additionally, the output system 120 can incorporate control logic for operating a radio transmitter, facilitating the transmission of electrical or electromagnetic data—such as processed sensor readings, analytical insights, or command signals—to key interconnected systems depicted in FIG. 1, including but not limited to the analytics server system 105, the intelligence server 138, and the endpoint devices 125*a* . . . 125*n* via protocols such as Wi-Fi, Bluetooth, cellular networks, or other wireless and/or wired communication standards.

In some embodiments, the output system 120 may be comprised in, or associated with one or more of the analytics server system 105, the intelligence server 138, and the endpoint devices 125*a* . . . 125*n*. In some cases, the output system 120 is proximal to one or more of analytics server system 105, the intelligence server 138, and the endpoint devices 125*a* . . . 125*n*.

System Environment

FIGS. 2 and 3 illustrate exemplary system and functional diagrams of a computing environment 200, within which one or more systems shown in FIG. 1 can be implemented. Specifically, FIG. 2 provides a system diagram of the computing environment, whereas FIG. 3 provides a detailed functional diagram of the computing environment 200.

The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 115 of FIG. 1. The computing environment 200 may be implemented on general-purpose hardware and/or specifically-purposed hardware as the case may require.

In some embodiments, the network 115 comprises an intelligent computing network that facilitates data communication (e.g., governed data communication) and coordination among the analytics server system 105, the intelligence server 138, the databases 111*a* and 111*b*, the one or more sensors 110, the output system 120, and the endpoint devices 125*a*-125*n*. This intelligent computing network transports data artifacts and metadata used throughout the disclosed workflow, including natural language input data, slots data, one or more operands (comprising sheet data and filter data), data scope information, execution mode data, hybrid response protocol, and validated response protocol; supports generation and exchange of intermediate output data, evaluation data, and verified output data; and returns natural language output data and provenance package data that include identifiers such as an evidence identifier, a computation-trace identifier, and verification metadata. In certain implementations, this intelligent computing network further provides authentication and encryption, integrity and ordering assurances, and transport of archiving, governance performance metrics, and annotation updates, thereby enabling deterministic or semi-deterministic operation of the intelligent computing system across distributed components and preserving traceability, revalidation behavior, and visualization delivery consistent with the validated data scope and the validated response protocol.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described subelements of the computing environment 200 may also be included in similar fashion in any of the other units and/or devices included in the network system 100 of FIG. 1. Additionally, any actions described as being performed by a processor may be executed by the processing unit 202 of FIG. 2 alone and/or by the processing unit 202 in conjunction with one or more additional processors, units, subunits, elements, components, devices, and/or the like. For example, the processing unit 202 may be configured to implement computing instructions that process or otherwise analyze data based on the disclosed workflows.

Further, while one processing unit 202 may be shown in FIG. 2, multiple processing units may be present and/or otherwise included in the computing environment 200 or elsewhere in the network system 100 of FIG. 1. Thus, while instructions may be described as being executed by the processing unit 202 (and/or various subunits of the processing unit 202), the instructions may be executed simultaneously, serially, and/or otherwise by one or multiple processing units 202 on one or more computing devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, image content, video content, textual content, audio-visual content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information. The location determination unit 214 may be associated with the one or more sensors 110, discussed above.

The GPU 216 may facilitate generation, modification, analysis, processing, transmission, and/or presentation of content described above, as well as any data such as pipeline data or analysis data or other output data generated using at least a file and/or the like. In some embodiments, the GPU 216 may be used to render content for presentation on a computing device via, for example, a graphical display device or a graphical user interface (GUI) of a display device of the endpoint device 125*a*. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operations within the computing environment 200. In one embodiment, the memory unit 204 stores instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the data unit 136 associated with the analytics server system 105. Furthermore, the memory unit 204 can also be used to store one or more computing models.

Turning back to FIGS. 2 and 3, the memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the local computing database 111*a* or remote computing database 111*b* associated with the analytics server system 105. In some embodiments, the memory unit 204 and/or its subunits may be local relative to the analytics server system 105 and/or be remotely located relative to the analytics server system 105.

The memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include the data unit 136 and the intelligence unit 140. The data unit 136 and/or intelligence unit 140 may be configured to implement one or more of the disclosed computing methods or operations. According to one embodiment, the data unit 136 and/or the intelligence unit 140 comprise one or more of a analytic data flux processor (ADFP), a cognitive data orchestration unit (CDOU), an insight generation hypervisor (IGH), a metric derivation computational fabric (MDCF), a phenomenological data synthesizer (PDS), a quantitative intelligence abstraction engine (QIAE), an adaptive data analytics core (ADAC), a contextual insight graph engine (CIGE), an empirical data transformation array (EDTA), or a heuristic data pattern extractor (HDPE).

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, an endpoint device (e.g., endpoint device 125*a*) may be required to download, install, access, and/or otherwise use a software application (e.g., web application) to facilitate performance of one or more of the disclosed computing operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the analytics server system 105 and/or the display device of the endpoint device 125*a* to communicate with each other.

The content storage unit 232 may facilitate deployment, storage, access, and/or utilization of information associated with performance of the disclosed operations by computing environment 200 and/or any other computing environment described. In some embodiments, content storage unit 232 may communicate with content management unit 212 to receive and/or transmit content files.

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing processes described herein. For example, elements of the I/O unit 206 may be used to receive input from the analytics server system 105. As described, I/O unit 206 may include subunits such as an I/O device 242, an I/O calibration unit 244, and/or driver 246.

The I/O device 242 may facilitate receipt, transmission, processing, presentation, display, input, and/or output of information as a result of executed processes described in this disclosure. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute the disclosed operations.

The I/O calibration unit 244 may facilitate the calibration of the I/O device 242. For example, I/O calibration unit 244 may detect and/or determine one or more settings of I/O device 242 and then adjust and/or modify settings and/or format and/or optimize viewing of a graphical user interface and/or one or more visualizations associated with alerts or alert data communications. According to some embodiments, the I/O calibration unit 244 may be used to format or resolve, for example, data communications such as alerts or data reports into multidimensional data components and rendering the multidimensional data components on a display device.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of data communications (e.g., control or alert data communications) between computing environment 200 and other computing environments, third party server systems, and/or the like. Communication unit 208 may also facilitate internal communications between various elements (e.g., units and/or subunits) of computing environment 200. For example, the communication unit 208 may be configured to receive document data as well as coordinate the transmission and/or storage of any attendant data such as analysis reports associated with analyzing the data, instructions and/or data to the one or more output system 120, and/or any alerts to stakeholders with one or more endpoint devices. In some embodiments, communication unit 208 may include a network protocol unit 248, an API gateway 250, an encryption unit 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed methods and/or data visualization operations and/or other processes provided in this disclosure.

The API gateway 250 may allow other devices and/or computing environments to access API unit 230 of memory unit 204 of computing environment 200. For example, display devices associated with the various systems of FIG. 1 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption unit 252 may facilitate translation, encryption, encoding, decryption, and/or decoding of information received, transmitted, and/or stored by the computing environment 200. Using encryption unit 252, each transmission of data may be encrypted, encoded, and/or translated for security reasons, and any received data may be encrypted, encoded, and/or translated prior to its processing and/or storage. In some embodiments, encryption unit 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 4:
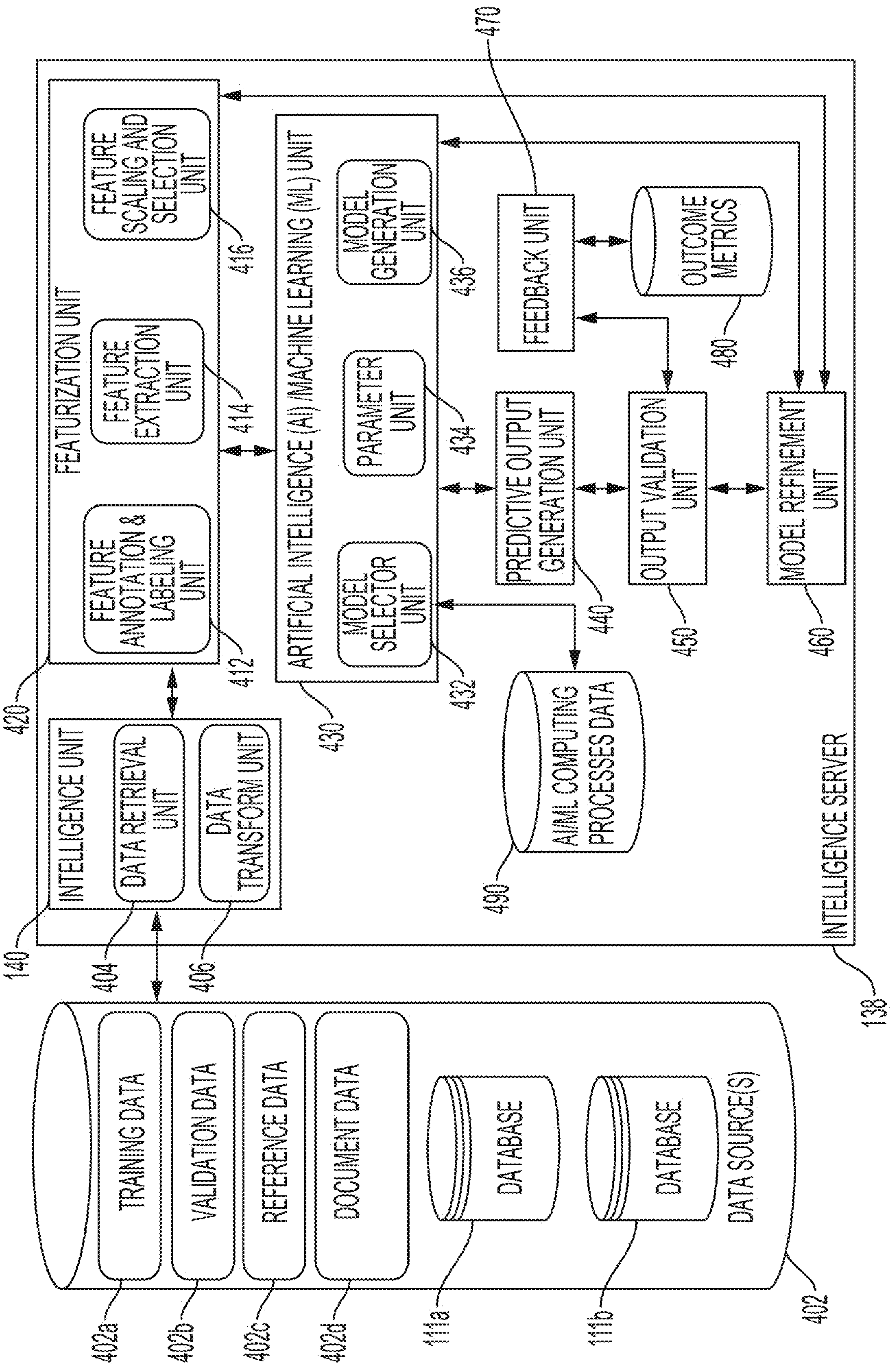
FIG. 4 shows an exemplary communicative coupling of the intelligence server to one or more data sources.

FIG. 4 shows an exemplary communicative coupling of the intelligence server 138 to one or more data sources. In the illustrated implementation, the intelligence server 138 comprises the above-referenced intelligence unit 140 that can include a data retrieval unit 404 and data transform unit

406. Data retrieval unit 404 may be configured to access, assess, interpret, request, or receive data, which may be adjusted, reformatted, or changed. For example, data retrieval unit 404 may request data from a remote source (e.g., data from the one or more sensors 110 and/or databases 111*a* and 111*b* of the analytics server system 105) using an API. Thus, the intelligence unit 140 may be configured to access, interpret, request, format, re-format, or receive input data from the one or more data sources outlined in data source(s) 402. For example, intelligence unit 140 may be configured to use data transform unit 406 to execute a re-configuration or other data changes or data transformations, such as a data dimension reduction prior to the analytics server 105 running intelligence computing operations on said transformed data. Data source(s) 402 may comprise captured data that is stored on one or more memories devices such as those discussed in association with FIGS. 2 and 3. In some embodiments, data source(s) 402 may be associated with a single entity (e.g., a single computing network) or with multiple entities (e.g., multiple computing networks). Data source(s) 402 may include one or more of training data 402*a* (e.g., input data to feed a machine learning model as part of one or more training processes), validation data 402*b* (e.g., data against which at least one processor may compare model output with, such as to determine model output quality), reference data 402*c*, and/or a document data 402*d*. In some embodiments, the document data 402*d* referenced in FIG. 4 comprises content derived from digital or physical documents and may include structured, semi-structured, or unstructured data originating from scanned document images, machine-readable files, tabular data extracts, multi-sheet workbook files, XML-based or JSON-based structured records, form-based data entries, PDF files, text-encoded value tables, metadata-embedded reports, semi-structured logs, or combinations thereof. The document data may be captured, detected, ingested, or received using one or more sensors 110 (including document-capture subsystems, file-ingest modules, or application interfaces) and may be transformed by the analytics server system 105 and/or the intelligence server 138 into conditioned data objects suitable for operand construction, data-scope definition, and downstream processing within the disclosed response-protocol workflow. Once conditioned, the document data may be persisted in database 111*a* or database 111*b* and treated as a governed data source from which sheet data, filter data, intermediate output data, evaluation data, verified output data, natural-language output data, and provenance package data may be generated using the deterministic or semideterministic computing operations described herein.

In some embodiments, intelligence unit 140 can be implemented using at least one computing device. For example, data from data sources 402 can be obtained through one or more I/O devices and/or network interfaces. Further, the received data may be stored (e.g., during execution of one or more operations) in a suitable storage or system memory. Intelligence unit 140 may also be configured to interact with a memory unit (e.g., memory unit 204), which may be implemented on a computing device that stores data in a storage device.

In some embodiments, intelligence unit 140 comprises an executable software module containing one or more instructions or computer-executable logic. These instructions are specifically configured to be executed by one or more processors, such as the processors discussed in association with FIGS. 2 and 3, to perform computing operations of the intelligence server 138 including coordinating with the various units of the intelligence server 138 to perform intelligent computing operations.

The intelligence server 138 may also include machine learning (ML) modeling unit 430, which may be configured to execute one or more modeling computing operations on an AI or ML model (e.g., model training, model re-configuration, model validation, model testing), such as those described in the processes described herein. For example, the ML modeling unit 430 may execute an operation to train an AI or ML model, such as adding, removing, or modifying a model parameter. Training of an AI or ML model may be supervised, semi-supervised, or unsupervised. In some embodiments, training of an AI or ML model may include multiple epochs, or passes of data (e.g., training data 402*a*) through an AI or ML model process (e.g., a training process). In some embodiments, different epochs may have different degrees of supervision (e.g., supervised, semi-supervised, or unsupervised).

Training data for a given AI or ML model under consideration may include input data (e.g., as described above) and/or data previously output from a model (e.g., forming recursive learning feedback). A model parameter may include one or more of a seed value, a model node, a model layer, a computing process, a function, a model connection (e.g., between other model parameters or between models), a model constraint, or any other digital component influencing the output of a model. A model connection may include or represent a relationship between model parameters and/or disparate models, which may be dependent or interdependent, hierarchical, and/or static or dynamic. The combination and configuration of the model parameters and relationships between model parameters discussed herein can be cognitively infeasible for the human mind to maintain or use. Without limiting the disclosed embodiments in any way, an ML or AI model may include millions, trillions, or even billions of model parameters.

ML modeling unit 430 may include model selector unit 432 (e.g., configured to select a model from among a plurality of models, such as based on input data), parameter selector unit 434 (e.g., configured to add, remove, and/or change one or more parameters of a model), and/or model generation unit 436 (e.g., configured to generate one or more machine learning models, such as according to model input data, model output data, comparison data, and/or validation data). In some embodiments, model selector unit 432 may be configured to receive input and/or transmit output to AI/ML computing processes database 490. AI/ML computing processes database 490 may store one or more AI/ML models, any of which may be fully trained, partially trained, or untrained. In one embodiment, an AI/ML model may be, or include, without limitation, one or more of (e.g., such as in the case of a metamodel) a statistical model, a complex computing process, a neural network (NN), a convolutional neural network (CNN), a generative neural network (GNN), a Word2Vec model, a bag of words model, a term frequency-inverse document frequency model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, a You Only Look Once (YOLO) computing model.

Intelligence server 138 can further include predictive output generation unit 440, output validation unit 450 (e.g., configured to apply validation data to machine learning model output), feedback unit 470 (e.g., configured to apply feedback to a model), and model refinement unit 460 (e.g., configured to update or re-configure a model). In some embodiments, feedback unit 470 may receive input and/or transmit output (e.g., output from a trained, partially trained, or untrained model) to outcome metrics database 480. Outcome metrics database 480 may be configured to store output from one or more models and may also be configured to associate output with one or more models. In some embodiments, outcome metrics database 480, or other device (e.g., model refinement unit 460 or feedback unit 470) may be configured to correlate output, detect trends in output data, and/or infer a change to input or model parameters to cause a particular model output or type of model output. In some embodiments, model refinement unit 460 may receive output from predictive output generation unit 440 or output validation unit 450. In some embodiments, model refinement unit 460 may transmit the received output to featurization unit 420 or ML modeling unit 430 in one or more iterative cycles.

Any or each unit of intelligence server 138 may comprise a computing unit or a data unit, which may be a packaged functional hardware unit designed for use with other components or a part of a program that implements specific computing operations. Any or each computing unit may be implemented using a computing environment such as those discussed in conjunction with FIGS. 2 and 3. In some embodiments, the functionality of intelligence server 138 may be split across multiple computing environments to allow for distributed processing of the data, which may improve output speed and reduce computational load on individual computing environments. In some embodiments, intelligence server 138 may use load-balancing to maintain stable resource loads (e.g., processing load, memory load, or bandwidth load) across multiple computing environments and to reduce the risk of a computing environment from becoming overloaded. In these or other embodiments, the different components may communicate over one or more I/O devices and/or network interfaces.

It is appreciated that the intelligence server 138 can beneficially facilitate implementing one or more computing operations associated with the network system 100 of FIG. 1. In effect, the intelligence server 138 provides the computational backbone for complex, single, or multi-stage intelligence computing processes.

Embodiments

The disclosed systems and methods implement an intelligent, governed data-processing framework that transforms a natural language input into verified output data and visualization artifacts through a multi-stage reasoning pipeline. This framework is designed to operate over structured, semi-structured, or unstructured data objects and to ensure that every stage of the reasoning process is traceable, auditable, and aligned with predetermined governance requirements. The technology described herein provides an integrated sequence of computing operations in which a deterministic or semi-deterministic intelligent computing system interprets the input query, identifies the relevant data scope, retrieves and curates evidence from one or more data sources, performs quantitative and logical evaluations, applies verification requirements, and generates natural language output data coupled with provenance package data.

According to some embodiments, the systems and methods begin by receiving a natural language input and determining slots data indicating a semantic intent associated with the data processing request. Based on the slots data, the system generates one or more operands identifying sheet data and filter data that define a data scope from which relevant information may be retrieved. This information may be used to determine an execution mode and to generate a hybrid response protocol represented in a structured or semi-structured data exchange format. The hybrid response protocol serves as a governed representation of how the system is to proceed, and validation produces a validated response protocol that includes at least the slots data and the one or more operands. These stages provide a defined basis for the system to consistently and reproducibly interact with large and varied data collections.

In some embodiments, the validated response protocol guides retrieval of information from structured, semi-structured, or unstructured data sources to produce intermediate output data. The retrieved information may be curated to ensure completeness, relevance, and structural alignment with the data scope. The curated information may then be used to generate evaluation data through one or more quantitative transformation computing operations or structural or logical evaluation computing operations. These evaluations allow the system to produce a consistent and governed representation of the results associated with the data processing request.

In some embodiments, the evaluation data may undergo one or more verification operations, including numerical consistency computing operations and compliance computing operations. These operations determine whether the evaluation data satisfies predetermined requirements and whether the verified output data is appropriate for subsequent transformation. Once the verified output data is generated, the system may produce natural language output data and a provenance package data that links answer text to identifiers derived from the operations performed across the pipeline, including evidence identifiers, computation-trace identifiers, and verification metadata. The visualizing may then present the natural language output data in response to the input query.

In some embodiments, the disclosed framework further supports auditability by archiving data artifacts associated with the validated response protocol and subsequent stages. The system may generate one or more performance metrics associated with the validated response protocol. In one embodiment, the performance metrics may be used to update intelligence models as the case may require. These capabilities enable the system to adapt and refine its behavior over time while preserving full traceability of each response generated through the pipeline.

Taken together, the systems and methods described herein provide a unified, governed approach to data access, retrieval, evaluation, verification, and visualization. By binding each stage of the reasoning process to explicit data structures-including the slots data, the one or more operands, the validated data scope, the hybrid response protocol, intermediate output data, evaluation data, verified output data, natural language output data, and provenance package data—the disclosed technology enhances consistency, accountability, and reliability in intelligent data-processing applications.

Exemplary Workflows

Figure 5A:
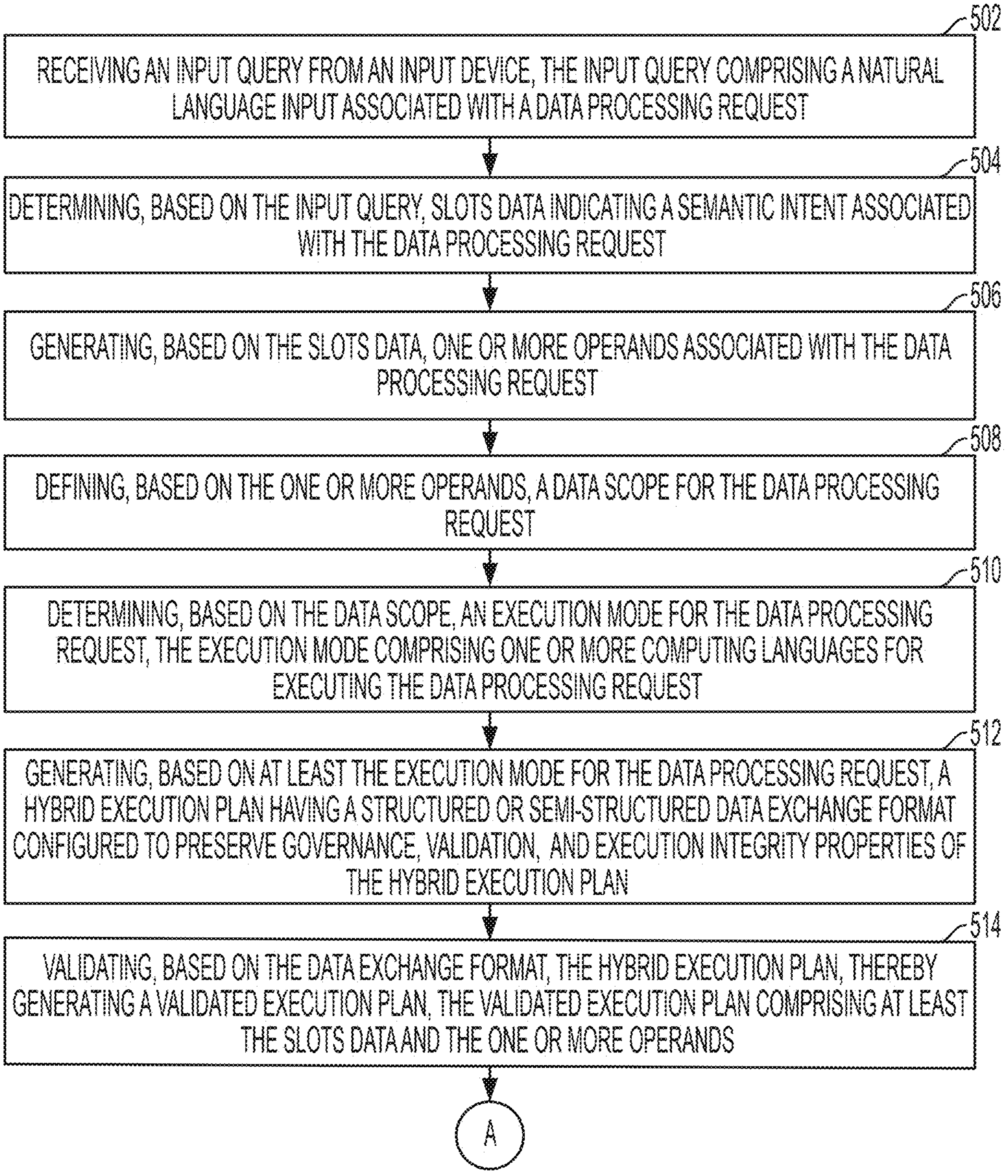
FIGS. 5A-5B show exemplary workflows associated with generating and implementing a response protocol associated with a query.
Figure 5B:
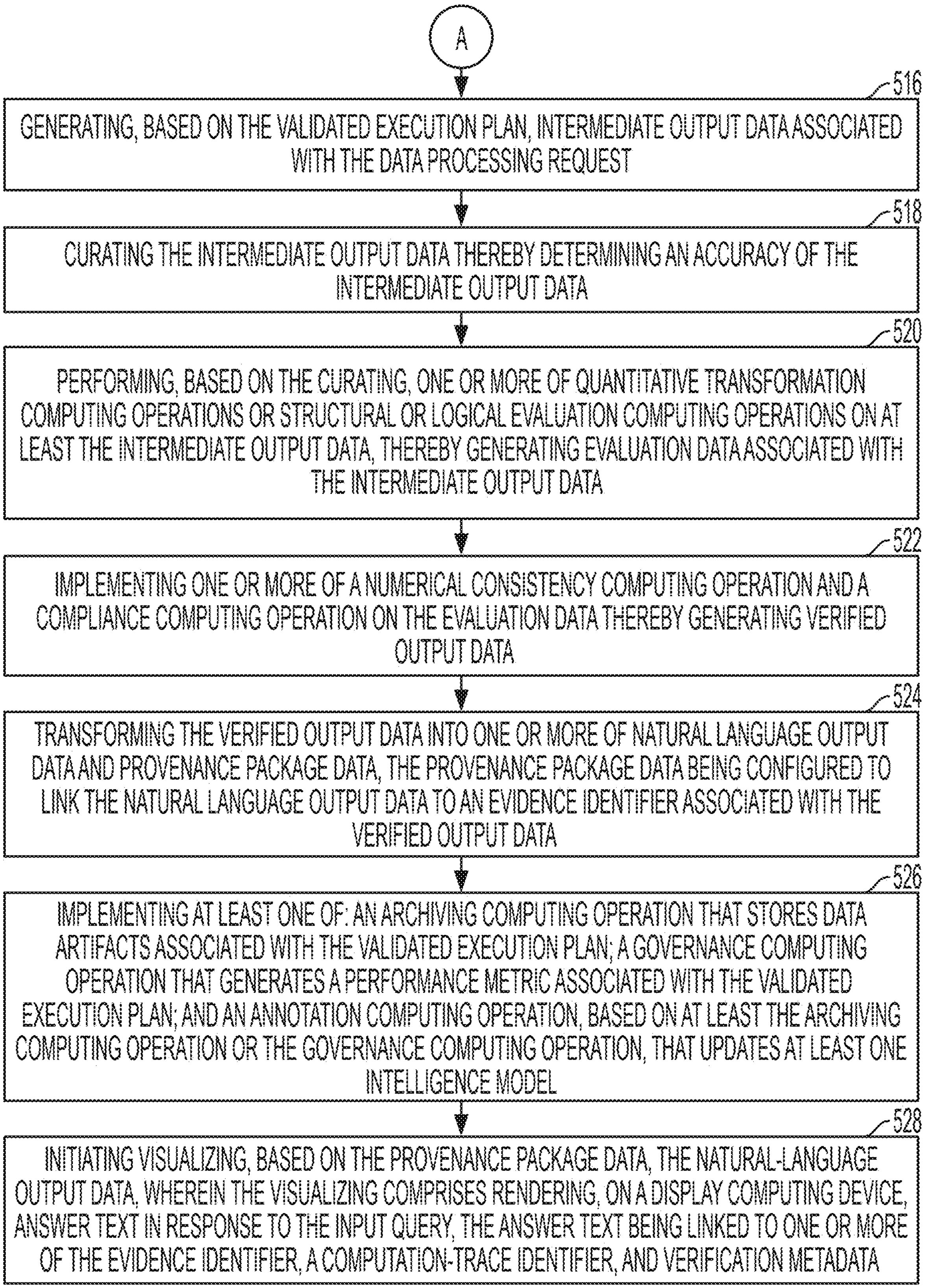

FIGS. 5A-5B show exemplary workflows associated with generating and implementing a response protocol associated with a query (e.g., a data query). One or more data units, comprising control logic or applications stored in a non-transitory memory device, can enable the implementation of various stages within these workflows. In particular, the one or more data units may be comprised in, or associated with a deterministic or semi-deterministic intelligent computing system (e.g., FIG. 1). The one or more data units can operate independently or in conjunction with a data communication software tool for transmitting and/or receiving or accessing document data, file data, or record data. Furthermore, the one or more data units may comprise one or more of the above-referenced data unit 136 and/or intelligence unit 140 as described in FIG. 1. In one embodiment, the query may be processed or otherwise analyzed to direct, control, or regulate the transmission of one or more data alerts and/or output data to one or more computing devices associated with the system of FIG. 1.

At block 502, the one or more data units receive an input query from an input device, the input query comprising a natural language input associated with a data processing request. Turning to block 504, the one or more data units may be used to determine, based on the input query, slots data indicating a semantic intent associated with the data processing request.

At block 506, the one or more data units may be used to generate, based on the slots data, one or more operands associated with the data processing request. At block 508 the one or more data units may determine (e.g., define), based on the one or more operands, a data scope for the data processing request. Turning to block 510, the one or more data units may determine, based on the data scope, an execution mode for the data processing request, the execution mode comprising one or more computing languages for executing the data processing request.

At block 512, the one or more data units may generate, based on at least the execution mode for the data processing request, a hybrid response protocol having a structured or semi-structured data exchange format configured to preserve governance, validation, and execution integrity properties of the hybrid response protocol. Additionally, the one or more data units may determine (e.g., validate), at block 514, based on the data exchange format, the hybrid response protocol, thereby generating a validated response protocol, the validated response protocol comprising at least the slots data and the one or more operands. For example, this validation may confirm that the execution mode is present and well-formed within the hybrid response protocol, and that the plan's structured or semi-structured data exchange format can be parsed during subsequent stages.

At block 516, the one or more data units generate, based on the validated response protocol, intermediate output data associated with the data processing request.

Turning to block 518, the one or more data units curate the intermediate output data thereby determining an accuracy of the intermediate output data. This may involve analyzing the intermediate output data to determine the accuracy of the intermediate output data. At block 520, the one or more data units perform or implement, based on the determining (e.g., curating), one or more of quantitative transformation computing operations or structural or logical evaluation computing operations on at least the intermediate output data, thereby generating evaluation data associated with the intermediate output data. At block 522, the one or more data units implement one or more of a numerical consistency computing operation and a compliance computing operation on the evaluation data thereby generating verified output data. Additionally, the one or more data units may transform, at block 524, the verified output data into one or more of natural language output data and provenance package data, the provenance package data being configured to link the natural language output data to an evidence identifier associated with the verified output data.

At block 526, the one or more data units may implement at least one of: an archiving computing operation that stores data artifacts associated with the validated response protocol or the natural language output data; a governance computing operation that generates a performance metric associated with the validated response protocol or the natural language output data; and an annotation computing operation, based on at least the archiving computing operation or the governance computing operation. In particular, the annotation computing operation beneficially enables recording or generating performance metrics, based on the disclosed workflow, and in some cases, generating training data (e.g., training data artifacts) that can be independently used to update an artificial intelligence model online, or offline. Additionally, the one or more data units may initiate visualizing, at block 528, based on the provenance package data, the natural language output data, wherein the visualizing comprises rendering, on a display computing device, answer text in response to the input query, the answer text being linked to one or more of the evidence identifier, a computation-trace identifier, and verification metadata.

In some implementations, the input query of block 502 can be a composite query that includes multiple sub-requests and may comprise multimodal or multilingual content. The one or more data units may segment the composite query into sub-queries and normalize each sub-query to a canonical natural language representation prior to determining the slots data at block 504. Where the input device comprises one or more endpoint devices 125*a*-125*n*, the composite query can be transmitted over the network 115 to the analytics server system 105 for processing.

In some implementations, the determination of slots data at block 504 produces a typed set of intent fields that includes domain-classification data, metric-classification data, temporal-classification data, and operation-classification data. These fields provide the semantic basis for constructing the operands at block 506 without requiring domain-specific business terminology.

In some implementations, the operands generated at block 506 comprise sheet data and filter data. The sheet data identifies a structured data source stored in database 111*a* or database 111*b*, and the filter data specifies one or more selection constraints, such as temporal, attribute-type, or domain-classification constraints, that isolate a subset of values for downstream processing. Each operand may be associated with row- or cell-level provenance identifiers that persist through retrieval, computation, verification, and explanation.

In some implementations, the data scope defined at block 508 acts—after validation—as a governed execution boundary. Retrieval operations (blocks 516 and 518) are limited to values addressable by the operand's sheet identifiers and filter constraints; computation at block 520 consumes only values admitted by that boundary; verification at block 522 evaluates only results produced within that boundary; and explanation at block 524 cites evidence identifiers originating from that boundary. Scope changes are applied through a revalidation process before additional retrieval or computation proceeds.

In some implementations, the execution mode selected at block 510 operates as a control boundary between a first response protocol configured for a row-level programmatic computing operation and a second response protocol configured for an aggregation or a join-based computing operation. A dual execution mode may orchestrate both plans while preserving trace alignment and explainability.

In some implementations, the hybrid response protocol generated at block 512 is represented in a structured or semi-structured data exchange format configured to preserve governance, validation, and execution integrity properties. The plan can include sub-plan identifiers, operand bindings, scope constraints, and execution-mode metadata to enable deterministic re-execution and independent stage validation.

In some implementations, validation at block 514 comprises generating a validated response protocol that comprises, at minimum, the slots data and the one or more operands. In certain cases, validation also comprises resolving retrieval targets so that subsequent retrieval adopts a stable scope and plan version, thereby ensuring consistency across blocks 516-524.

In some implementations, the intermediate output data produced at block 516 corresponds to retrieved data selected from database 111*a* or database 111*b* using the validated data scope and the response protocol. The curation at block 518 can include semantic relevance checks with respect to the slots data, operand-coverage checks, normalization, deduplication, and cross-sheet coherence checks across row-level, aggregated-value, and rule-definition sheet types, with integrity flags gating entry into block 520.

In some implementations, block 520 supports operation types including variance, anomaly detection, lookup, trend analysis, ratio, aggregation, threshold evaluation, correlation, classification, and normalization. Each operation can be deterministically executed in accordance with the validated data scope and can be bound to the one or more operands such that resulting output is traceable to the structured data source, reproducible upon re-execution, and subject to verification prior to authorization at block 522.

In some implementations, the numerical consistency computing operation and the compliance computing operation at block 522 perform reconciliation-gated output with blocking behavior. A reconciliation process can compute a delta data value against a reference source; a policy check can generate flags data; and an assessment can block or allow verified output based on those flags.

In some implementations, the transformation at block 524 produces natural language output data and a provenance package data that links rendered statements to evidence identifiers, computation-trace identifiers, and verification metadata. The provenance package data may also include plan and scope identifiers to support auditing and downstream visualization on endpoint devices 125*a*-125*n*.

In some implementations, the computing operations at block 526 include archiving data artifacts associated with the validated response protocol; generating governance performance metrics; and performing annotation computing operations that capture performance metrics associated with the disclosed method. The annotation computing operations can operate with zero-shot or few-shot configurations under deterministic or semi-deterministic governance, preserving auditability and integrity of previously stored artifacts in database 111*a* and/or database 111*b*.

In some implementations, the deterministic or semi-deterministic intelligent computing system that executes blocks 502-526 includes one or more of: a rule-based computing operation; a symbolic computing operation; a constrained execution mechanism applied to a large language intelligence model; a governance computing operation; and a reconciliation, veto, or blocking behavior computing operation (as further discussed below), thereby providing an execution authority that prevents unauthorized output.

In some implementations, sheet data and filter data used in blocks 506, 508, 516, and 518 correspond to structured data maintained in database 111*a* or database 111*b*, including by way of example row-level data sheets, aggregated-value data sheets, and rule-definition data sheets. Filters (e.g., data filters) may include temporal, attribute-type, or domain-classification constraints. All sheet and filter selections are provenance-addressable and enforceable at retrieval time by the analytics server system 105.

In some implementations, one or more endpoint devices 125*a*-125*n* transmit the input query for block 502 and receive the natural language output and visualization data produced at blocks 524-526 from the analytics server system 105 over the network 115. Stored data structures and data artifacts-including the validated response protocol, curated evidence data, computation-traces, verification data objects, and explanation/provenance package data—can be stored in database 111*a* and/or database 111*b* for audit purposes.

In other embodiments, a system and a computer program product can include or execute the method described above. These and other implementations may each optionally include one or more of the following features.

According to one embodiment, the deterministic or semi-deterministic intelligent computing system referenced above is configured to implement one or more of: a rule-based computing operation associated with generating or implementing the validated response protocol; a zero-temperature large language intelligence computing model configured to implement at least one constrained execution computing operation associated with generating or implementing the validated response protocol; a symbolic computing operation associated with generating or implementing the validated response protocol; a deterministic or semi-deterministic governance computing operation associated with generating or implementing the validated response protocol; and a reconciliation, veto, or blocking behavior computing operation associated with generating or implementing the validated response protocol.

It is appreciated that the input query comprises context data on which at least the slots data is based, the context data comprising at least one of: organizational-scope data associated with the data processing request; scenario data associated with the one or more operands; and first temporal data associated with a time window for which the slots data is determined.

It is further appreciated that the slots data indicates or is associated with at least one of: domain data indicating an organizational unit associated with the data processing request; metric data indicating a qualitative or a quantitative attribute associated with the data processing request; second temporal data for determining the slots data; and operation-type data associated with at least one computing operation associated with the data processing request.

In some implementations, the operation-type data comprises at least one of: a variance computing operation associated with the data processing request that determines difference data between two or more data values associated with the one or more operands; an anomaly-detection computing operation associated with the data processing request that identifies a deviation from one or more threshold data associated with the one or more operands; a lookup computing operation associated with the data processing request that retrieves a data value associated with the one or more operands; a trend-analysis computing operation that identifies change across data values; a ratio computing operation associated the data processing request that generates relationship data between two or more data values associated with the one or more operands; an aggregation computing operation associated with the data processing request that combines a two or more data values into a consolidated value associated with the one or more operands; a threshold-evaluation computing operation associated with the data processing request that determines whether at least one data value satisfies a predefined logical or numerical condition associated with the one or more operands; a correlation computing operation associated with the data processing request that determines a dependency or association between two or more data variables associated with the one or more operands; a classification computing operation associated with the data processing request that assigns one or more data values to at least one data category based on one or more rules associated with the one or more operands; and a normalization computing operation that transforms homogeneous or heterogeneous data values into a scalar data value associated with the one or more operands.

Additionally, at least one of: the variance computing operation is deterministically executed in accordance with a first validated data scope and is bound to the one or more operands such that the verified output data is: traceable to a structured data source, reproducible upon re-execution, and subject to verification prior to authorizing use of the verified output data; the anomaly-detection computing operation is deterministically executed in accordance with a second validated data scope and is bound to the one or more operands such that the verified output data is: traceable to the structured data source, reproducible upon re-execution, and subject to verification prior to authorizing use of the verified output data; the lookup computing operation is deterministically executed in accordance with a third validated data scope and is bound to the one or more operands such that the verified output data is: traceable to the structured data source, reproducible upon re-execution, and subject to verification prior to authorizing use of the verified output data; and the trend-analysis computing operation is deterministically executed in accordance with a fourth validated data scope and is bound to the one or more operands such that the verified output data is traceable to the structured data source, reproducible upon re-execution, and subject to verification prior to authorizing use of the verified output data.

In some embodiments, at least one of the ratio computing operation, the aggregation computing operation, the threshold-evaluation computing operation, the correlation computing operation, the classification computing operation, and the normalization computing operation may be deterministically executed in accordance with corresponding validated data scopes and bound to the one or more operands such that resulting verified output data remains traceable to a structured data source, reproducible upon re-execution, and subject to verification prior to authorizing use of the verified output data. For example, the ratio computing operation may be deterministically executed in accordance with a fifth validated data scope and bound to the one or more operands such that the verified output data is traceable to a structured data source, reproducible upon re-execution, and subject to verification prior to authorizing use of the verified output data. Likewise, the aggregation computing operation may be deterministically executed in accordance with a sixth validated data scope and bound to the one or more operands such that the verified output data is traceable to the structured data source, reproducible upon re-execution, and subject to verification prior to authorizing use of the verified output data. In further implementations, the threshold-evaluation computing operation may be deterministically executed in accordance with a seventh validated data scope and bound to the one or more operands such that the verified output data is traceable to the structured data source, reproducible upon re-execution, and subject to verification prior to authorizing use of the verified output data. Similarly, the correlation computing operation may be deterministically executed in accordance with an eighth validated data scope and bound to the one or more operands such that the verified output data is traceable to the structured data source, reproducible upon re-execution, and subject to verification prior to authorizing use of the verified output data. Additionally, the classification computing operation may be deterministically executed in accordance with a ninth validated data scope and bound to the one or more operands such that the verified output data is traceable to the structured data source, reproducible upon re-execution, and subject to verification prior to authorizing use of the verified output data. Finally, the normalization computing operation may be deterministically executed in accordance with a tenth validated data scope and bound to the one or more operands such that the verified output data is traceable to the structured data source, reproducible upon re-execution, and subject to verification prior to authorizing use of the verified output data.

According to one embodiment, the one or more operands comprise at least one of: sheet data indicating a structured data source from which one or more data values for the data processing request are retrievable; and filter data indicating one or more selection constraints for identifying a subset of the structured data source associated with the data processing request. It is appreciated that the sheet data comprises at least one of a record data sheet, an aggregated-value data sheet, or a rule-definition data sheet; and the filter data comprises at least one selection constraint including a temporal constraint, an attribute-type constraint, or a domain-classification constraint.

In exemplary implementations, the data scope comprises at least one of: sheet data indicating a structured data source from which data associated with the data processing request is retrievable; and filter data indicating one or more selection constraints for identifying a subset of the structured data source; and the data scope, once validated, constrains downstream retrieval and computation unless modified through a revalidation process.

According to one embodiment, the hybrid response protocol comprises: a first response protocol configured for a row-level programmatic computing operation; and a second response protocol configured for an aggregation or a join-based computing operation.

Moreover, the numerical consistency computing operation or the compliance computing operation comprises implementing one or more of: a reconciliation computing operation to determine a delta data value associated with the evaluation data; a policy check computing operation, based on the delta data value, to determine flags data associated with the evaluation data; and an assessment computing operation associated with the policy check computing operation, based on the flags data, to determine whether to block or allow the verified output data.

Furthermore, the above method can comprise implementing, prior to generating the verified output data, a coherence or evidence alignment computing operation on the evaluation data to enforce logical consistency across the intermediate output data.

In some embodiments, the deterministic or semi-deterministic intelligent computing system referenced above may comprise one or more computing device processors configured to execute computing operations in a manner that follows predetermined rules, constraints, or structured workflows. The deterministic or semi-deterministic intelligent computing system may regulate the use of data produced at various stages of the workflow shown in FIGS. 5A-5B, such that information generated at one stage is used in a subsequent stage when predetermined conditions related to structure, completeness, or logical consistency are met.

In some embodiments, a natural language input may comprise a query expressed in a human language format received from an input device. The natural language input may include conversational or descriptive text written in one or more languages and may be processed to determine slots data indicating a semantic intent associated with the data processing request.

In some embodiments, curating the intermediate output data may include determining one or more characteristics of the intermediate output data to assess its accuracy. Curating may include determining whether the intermediate output data corresponds to the validated data scope, whether the intermediate output data is complete, and whether the intermediate output data satisfies one or more relevance, structural, or logical criteria. In certain cases, results of the curating may inform whether the intermediate output data should be used during a quantitative transformation computing operation or a structural or logical evaluation computing operation.

In some embodiments, quantitative transformation computing operations may include one or more computing operations that transform at least a portion of the intermediate output data into evaluation data. Such operations may include, for example, a variance computing operation, an anomaly-detection computing operation, a lookup computing operation, a trend-analysis computing operation, a ratio computing operation, an aggregation computing operation, or a normalization computing operation.

In some embodiments, structural or logical evaluation computing operations may include one or more computing operations that evaluate the intermediate output data by applying one or more rule-definition data entries, logical conditions, or structural relationships associated with the one or more operands. Results of such operations may form part of the evaluation data used during the numerical consistency computing operation or the compliance computing operation.

In some embodiments, a numerical consistency computing operation may determine one or more numerical relationships, such as determining a delta data value associated with the evaluation data. The numerical consistency computing operation may determine whether the delta data value or other related information satisfies predetermined requirements before producing verified output data.

In some embodiments, a compliance computing operation may include determining whether the evaluation data satisfies one or more conditions associated with one or more policy requirements. A compliance computing operation may include determining flags data and performing one or more assessment computing operations to determine whether the verified output data should progress to transformation or visualization.

In some embodiments, natural language output data may include descriptive text or explanation data generated at block 524 using the verified output data. The natural language output data may be linked to a provenance package data that includes one or more identifiers associated with evidence, computation-traces, and verification metadata. Such natural language output data may be suitable for presentation on an endpoint device.

In some embodiments, the deterministic or semi-deterministic intelligent computing system may regulate how the slots data, the one or more operands, the data scope, the execution mode, or the hybrid response protocol are used to generate intermediate output data, evaluation data, or verified output data. In certain implementations, the system may determine whether one or more structural or logical requirements are met before allowing data produced at one stage to be used in one or more subsequent stages.

In some embodiments, the zero-temperature large language intelligence computing model may be used in a constrained execution computing operation to generate natural language output data or to format portions of the provenance package data without modifying the slots data, the one or more operands, the data scope, the intermediate output data, the evaluation data, or the verified output data. The natural language output data generated by such a model may be based on information produced by earlier deterministic or semi-deterministic computing operations.

In some embodiments, a symbolic computing operation may apply one or more rule-definition data entries stored in a rule-definition data sheet to data values obtained from a record data sheet or aggregated-value data sheet identified by the sheet data of an operand. Results of such symbolic computing operations may be used during curating, the quantitative transformation computing operations, or the structural or logical evaluation computing operations.

In some embodiments, a deterministic or semi-deterministic governance computing operation may determine whether the hybrid response protocol includes required information such as the slots data, the one or more operands, or metadata identifying the execution mode. A governance computing operation may also determine whether the intermediate output data reflects data retrieved in accordance with the validated data scope.

In some embodiments, the reconciliation, veto, or blocking behavior computing operation may determine whether conditions detected during the numerical consistency computing operation or the compliance computing operation warrant halting downstream processing. For example, an assessment computing operation may determine whether verified output data should be blocked when one or more deviations or flags indicate issues that require additional action.

In some embodiments, context data associated with an input query, such as organizational-scope data, scenario data, or first temporal data, may be incorporated into the validated response protocol. When context data is included, the system may determine that one or more components of the hybrid response protocol require revalidation if the context data is modified.

In some embodiments, validation of the hybrid response protocol may include determining that the hybrid response protocol contains the slots data, the one or more operands, the data scope, and the execution mode. Validation may also include confirming that the sheet data and filter data associated with each operand correspond to data sources accessible within database 111*a* or database 111*b*, and that the structured or semi-structured data exchange format can support subsequent computation or visualization.

In some embodiments, the structured or semi-structured data exchange format used to represent the hybrid response protocol may include a format that preserves field names, operand references, data scope information, execution mode metadata, or other information required to support re-execution, inspection, or downstream processing.

In some embodiments, the provenance package data may include one or more identifiers that associate the natural language output data with the evidence identifier, the computation-trace identifier, and verification metadata. The provenance package data may include additional identifiers to support determining how the verified output data was generated.

In some embodiments, a governance computing operation associated with block 526 may determine one or more performance metrics associated with the validated response protocol. These performance metrics may indicate whether curation, computation, or verification completed without issue or whether revalidation was performed. The performance metrics may be stored and referenced during annotation operations.

In some embodiments, the annotation computing operation may update one or more intelligence models based on archived data artifacts, verification metadata, or one or more performance metrics. Such updates may include adjusting rule-definitions, modifying operand filter constraints, refining mappings used to determine slots data, or adjusting parameters used in one or more verification operations.

In some embodiments, the disclosed methods and systems provide a practical application to data processing by executing a governed and coordinated sequence of computing operations that access, retrieve, curate, compute, verify, and visualize structured, semi-structured, or unstructured data. The workflow begins at blocks 502-504 by receiving a natural language input and determining slots data that capture a semantic intent. This enables the system to generate a consistent representation of the data processing request across diverse data formats without requiring manual interpretation of underlying data structures, contextual fields, or embedded relationships.

In some embodiments, generating the one or more operands and defining the data scope at blocks 506-508 produces sheet data and filter data that identify the specific portions of structured, semi-structured, or unstructured content needed for downstream processing. This operand-based approach establishes a reliable mechanism for identifying, constraining, and aligning data drawn from document-derived data objects, multi-sheet workbook files, semi-structured logs, metadata-embedded reports, or other heterogeneous repositories. The operand and data-scope construction process creates a well-formed and governed path for retrieval that a person is not capable of replicating with comparable precision, consistency, or scalability.

In some embodiments, determining the execution mode and generating the hybrid response protocol at blocks 510-512 yields a structured or semi-structured data exchange representation that coordinates row-level programmatic computing operations with aggregation or join-based computing operations. This hybrid response protocol governs how the system transforms and evaluates data across large and diverse repositories and provides a machine-readable representation of the specific sequence of governed steps to be performed. Coordinating these steps requires maintaining alignment among the slots data, the one or more operands, the data scope, the execution mode, and the expected structure of intermediate output data—an integrated process that cannot feasibly be performed by a person due to the volume, interconnectedness, and internal constraints among the data sources.

In some embodiments, curating the intermediate output data and generating evaluation data at blocks 518-520 includes performing accuracy checks, structural comparisons, logical assessments, and quantitative transformation computing operations or structural or logical evaluation computing operations. These operations may involve analyzing large and varied data inputs, comparing content retrieved from record data sheets, aggregated-value data sheets, or rule-definition data sheets, and aligning values derived from semi-structured or unstructured sources. Executing these coordinated assessments across numerous data entries and across multiple data formats requires computational processes designed for this purpose.

In some embodiments, implementing numerical consistency computing operations and compliance computing operations at block 522 enforces reconciliation and policy checks that determine whether evaluation data satisfies predetermined requirements. These operations integrate delta data values, flags data, threshold information, and rule-related conditions across numerous interdependent data points. The disclosed processes ensure that the system halts or advances computation in a governed manner that cannot reasonably be carried out manually due to the complexity and number of checks applied.

In some embodiments, transforming the verified output data into natural language output data and generating provenance package data at block 524 comprises creating answer text linked to evidence identifiers, computation-trace identifiers, and verification metadata. This linkage supports visualization at block 526 that reflects how the verified output data was produced, providing transparency, reproducibility, and traceability across structured, semi-structured, or unstructured sources. Achieving this level of integrated provenance and visualization requires coordinated machine processing across all stages of the workflow.

Taken together, the disclosed computing operations form a multi-stage pipeline adapted to the challenges of accessing, retrieving, transforming, evaluating, verifying, and visualizing structured, semi-structured, or unstructured data. The coordinated use of slots data, the one or more operands, the validated data scope, the hybrid response protocol, intermediate output data, evaluation data, verified output data, natural language output data, and provenance package data provides a concrete improvement in computer-implemented data processing. The disclosed processes advance the domain of computer-based data access, retrieval, and visualization by enabling governed execution, structured plan representation, operand-bound data selection, curation-based quality control, deterministic verification, and provenance-linked output-capabilities that a person cannot feasibly perform with comparable accuracy, consistency, or scalability.

The terminology used in this disclosure is for the purpose of describing particular exemplary embodiments and is not intended to be limiting. For example, as used herein, the singular forms "a," "an," and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, processes, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers, and/or sections should not be limited by these terms. These terms may be used to distinguish one element, component, region, layer or section from another element, component, region, layer, or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claim.

What is claimed is:

1. A method for deterministically or semi-deterministically generating and implementing a response protocol associated with a query, the method comprising:

receiving, using one or more computing device processors associated with a deterministic or semi-deterministic intelligent computing system, an input query from an input device, the input query comprising a natural language input associated with a data processing request;

determining, using the one or more computing device processors associated with the deterministic or semi-deterministic intelligent computing system, based on the input query, slots data indicating a semantic intent associated with the data processing request;

generating, using the one or more computing device processors associated with the deterministic or semi-deterministic intelligent computing system, based on the slots data, one or more operands associated with the data processing request;

defining, using the one or more computing device processors associated with the deterministic or semi-deterministic intelligent computing system, based on the one or more operands, a data scope for the data processing request;

determining, using the one or more computing device processors associated with the deterministic or semi-deterministic intelligent computing system, based on the data scope, an execution mode for the data processing request, the execution mode comprising one or more computing languages for executing the data processing request;

generating, using the one or more computing device processors associated with the deterministic or semi-deterministic intelligent computing system, based on at least the execution mode for the data processing request, a hybrid response protocol having a structured or semi-structured data exchange format configured to preserve governance, validation, and execution integrity properties of the hybrid response protocol;

validating, using the one or more computing device processors associated with the deterministic or semi-deterministic intelligent computing system, based on the data exchange format, the hybrid response protocol, thereby generating a validated response protocol, the validated response protocol comprising at least the slots data and the one or more operands;

generating, using the one or more computing device processors associated with the deterministic or semi-deterministic intelligent computing system, based on the validated response protocol, intermediate output data associated with the data processing request;

curating, using the one or more computing device processors associated with the deterministic or semi-deterministic intelligent computing system, the intermediate output data thereby determining an accuracy of the intermediate output data;

performing, using the one or more computing device processors associated with the deterministic or semi-deterministic intelligent computing system, based on the curating, one or more of quantitative transformation computing operations or structural or logical evaluation computing operations on at least the intermediate output data, thereby generating evaluation data associated with the intermediate output data;

implementing, using the one or more computing device processors associated with the deterministic or semi-deterministic intelligent computing system, one or more of a numerical consistency computing operation and a compliance computing operation on the evaluation data thereby generating verified output data;

transforming, using the one or more computing device processors associated with the deterministic or semi-deterministic intelligent computing system, the verified output data into one or more of natural language output data and provenance package data, the provenance package data being configured to link the natural language output data to an evidence identifier associated with the verified output data;

implementing, using the one or more computing device processors associated with the deterministic or semi-deterministic intelligent computing system, at least one of:

an archiving computing operation that stores data artifacts associated with the validated response protocol, a governance computing operation that generates a first performance metric associated with the validated response protocol, and an annotation computing operation, based on at least the archiving computing operation or the governance computing operation that generates a second performance metric associated with the verified output data, and initiating visualizing, using the one or more computing device processors associated with the deterministic or semi-deterministic intelligent computing system, based on the provenance package data, the natural language output data, wherein the visualizing comprises rendering, on a display computing device, answer text in response to the input query, the answer text being linked to one or more of the evidence identifier, a computation-trace identifier, and verification metadata.

2. The method of claim 1, wherein the deterministic or semi-deterministic intelligent computing system is configured to implement one or more of:

a rule-based computing operation associated with generating or implementing the validated response protocol, a zero-temperature large language intelligence computing model configured to implement at least one constrained execution computing operation associated with generating or implementing the validated response protocol, a symbolic computing operation associated with generating or implementing the validated response protocol, a deterministic or semi-deterministic governance computing operation associated with generating or implementing the validated response protocol, and a reconciliation, veto, or blocking behavior computing operation associated with generating or implementing the validated response protocol.

3. The method of claim 1, wherein the input query comprises context data on which at least the slots data is based, the context data comprising at least one of:

organizational-scope data associated with the data processing request, scenario data associated with the one or more operands, and first temporal data associated with a time window for which the slots data is determined.

4. The method of claim 1, wherein the slots data indicates or is associated with at least one of:

domain data indicating an organizational unit associated with the data processing request, metric data indicating a qualitative or a quantitative attribute associated with the data processing request, second temporal data for determining the slots data, and operation-type data associated with at least one computing operation associated with the data processing request.

5. The method of claim 4, wherein the operation-type data comprises at least one of:

a variance computing operation associated with the data processing request that determines difference data between two or more first data values associated with the one or more operands, an anomaly-detection computing operation associated with the data processing request that identifies a deviation from one or more threshold data associated with the one or more operands, a lookup computing operation associated with the data processing request that retrieves a data value associated with the one or more operands, a trend-analysis computing operation that identifies change across data values, a ratio computing operation associated the data processing request that generates relationship data between two or more second data values associated with the one or more operands, an aggregation computing operation associated with the data processing request that combines two or more third data values into a consolidated value associated with the one or more operands, a threshold-evaluation computing operation associated with the data processing request that determines whether at least one data value satisfies a predefined logical or numerical condition associated with the one or more operands, a correlation computing operation associated with the data processing request that determines a dependency or association between two or more data variables associated with the one or more operands, a classification computing operation associated with the data processing request that assigns one or more data values to at least one data category based on one or more rules associated with the one or more operands, and a normalization computing operation that transforms homogeneous or heterogeneous data values into a scalar data value associated with the one or more operands.

6. The method of claim 5, wherein at least one of:

the variance computing operation is deterministically executed in accordance with a first validated data scope and is bound to the one or more operands such that the verified output data is: traceable to a structured data source, reproducible upon re-execution, and subject to verification prior to authorizing use of the verified output data, the anomaly-detection computing operation is deterministically executed in accordance with a second validated data scope and is bound to the one or more operands such that the verified output data is: traceable to the structured data source, reproducible upon re-execution, and subject to verification prior to authorizing use of the verified output data, the lookup computing operation is deterministically executed in accordance with a third validated data scope and is bound to the one or more operands such that the verified output data is: traceable to the structured data source, reproducible upon re-execution, and subject to verification prior to authorizing use of the verified output data, and the trend-analysis computing operation is deterministically executed in accordance with a fourth validated data scope and is bound to the one or more operands such that the verified output data is traceable to the structured data source, reproducible upon re-execution, and subject to verification prior to authorizing use of the verified output data.

7. The method of claim 1, wherein the one or more operands comprise at least one of:

sheet data indicating a structured data source from which one or more data values for the data processing request are retrievable, and filter data indicating one or more selection constraints for identifying a subset of the structured data source associated with the data processing request.

8. The method of claim 7, wherein:

the sheet data comprises at least one of a record data sheet, an aggregated-value data sheet, or a rule-definition data sheet, and the filter data comprises at least one selection constraint including a temporal constraint, an attribute-type constraint, or a domain-classification constraint.

9. The method of claim 1, wherein:

the data scope comprises at least one of:

sheet data indicating a structured data source from which data associated with the data processing request is retrievable, and filter data indicating one or more selection constraints for identifying a subset of the structured data source, and the data scope, once validated, constrains downstream retrieval and computation unless modified through a revalidation process.

10. The method of claim 1, wherein the hybrid response protocol comprises:

a first response protocol configured for a row-level programmatic computing operation, and a second response protocol configured for an aggregation or a join-based computing operation.

11. The method of claim 1, wherein the numerical consistency computing operation or the compliance computing operation comprises implementing one or more of:

a reconciliation computing operation to determine a delta data value associated with the evaluation data, a policy check computing operation, based on the delta data value, to determine flags data associated with the evaluation data, and an assessment computing operation associated with the policy check computing operation, based on the flags data, to determine whether to block or allow the verified output data.

12. The method of claim 1, further comprising implementing, prior to generating the verified output data, a coherence or evidence alignment computing operation on the evaluation data to enforce logical consistency across the intermediate output data.

13. One or more systems for deterministically or semi-deterministically generating and implementing a response protocol associated with a query, the one or more systems comprising:

one or more computing servers comprising one or more computing device processors and a memory storing instructions, the instructions being executable by the one or more computing device processors to:

receive an input query from an input device, the input query comprising a natural language input associated with a data processing request;

determining, based on the input query, slots data indicating a semantic intent associated with the data processing request;

generating, based on the slots data, one or more operands associated with the data processing request;

defining, based on the one or more operands, a data scope for the data processing request;

determining, based on the data scope, an execution mode for the data processing request, the execution mode comprising one or more computing languages for executing the data processing request;

generating, based on at least the execution mode for the data processing request, a hybrid response protocol having a structured or semi-structured data exchange format configured to preserve governance, validation, and execution integrity properties of the hybrid response protocol, validating, based on the data exchange format, the hybrid response protocol, thereby generating a validated response protocol, the validated response protocol comprising at least the slots data and the one or more operands;

generating, based on the validated response protocol, intermediate output data associated with the data processing request;

curating the intermediate output data thereby determining an accuracy of the intermediate output data;

performing, based on the curating, one or more of quantitative transformation computing operations or structural or logical evaluation computing operations on at least the intermediate output data, thereby generating evaluation data associated with the intermediate output data;

implementing one or more of a numerical consistency computing operation and a compliance computing operation on the evaluation data thereby generating verified output data;

transforming the verified output data into one or more of natural language output data and provenance package data, the provenance package data being configured to link the natural language output data to an evidence identifier associated with the verified output data;

implementing at least one of:

an archiving computing operation that stores data artifacts associated with the validated response protocol, a governance computing operation that generates a first performance metric associated with the validated response protocol, and an annotation computing operation, based on at least the archiving computing operation or the governance computing operation that generates a second performance metric associated with the verified output data, and initiating visualizing based on the provenance package data, the natural language output data, wherein the visualizing comprises rendering, on a display computing device, answer text in response to the input query, the answer text being linked to one or more of the evidence identifier, a computation-trace identifier, and verification metadata.

14. The one or more systems of claim 13, wherein the one or more computing device processors are associated with a deterministic or semi-deterministic intelligent computing system configured to implement one or more of:

a rule-based computing operation associated with generating or implementing the validated response protocol, a zero-temperature large language intelligence computing model configured to implement at least one constrained execution computing operation associated with generating or implementing the validated response protocol, a symbolic computing operation associated with generating or implementing the validated response protocol, a deterministic or semi-deterministic governance computing operation associated with generating or implementing the validated response protocol, and a reconciliation, veto, or blocking behavior computing operation associated with generating or implementing the validated response protocol.

15. The one or more systems of claim 13, wherein the input query comprises context data on which at least the slots data is based, the context data comprising at least one of:

organizational-scope data associated with the data processing request, scenario data associated with the one or more operands, and first temporal data associated with a time window for which the slots data is determined.

16. The one or more systems of claim 13, wherein the one or more operands comprise at least one of:

sheet data indicating a structured data source from which one or more data values for the data processing request are retrievable, and filter data indicating one or more selection constraints for identifying a subset of the structured data source associated with the data processing request.

17. The one or more systems of claim 16, wherein:

the sheet data comprises at least one of a record data sheet, an aggregated-value data sheet, or a rule-definition data sheet, and the filter data comprises at least one selection constraint including a temporal constraint, an attribute-type constraint, or a domain-classification constraint.

18. The one or more systems of claim 13, wherein:

the data scope comprises at least one of:

sheet data indicating a structured data source from which data associated with the data processing request is retrievable, and filter data indicating one or more selection constraints for identifying a subset of the structured data source, and the data scope, once validated, constrains downstream retrieval and computation unless modified through a revalidation process.

19. The one or more systems of claim 13, wherein the hybrid response protocol comprises:

a first response protocol configured for a row-level programmatic computing operation, and a second response protocol configured for an aggregation or a join-based computing operation.

20. A method for deterministically or semi-deterministically generating and implementing a response protocol associated with a query in an intelligent computing network, the method comprising:

receiving, using one or more computing device processors associated with a deterministic or semi-deterministic intelligent computing system, an input query from an input device, the input query comprising a natural language input associated with a data processing request;

determining, using the one or more computing device processors associated with the deterministic or semi-deterministic intelligent computing system, based on the input query, slots data indicating a semantic intent associated with the data processing request;

generating, using the one or more computing device processors associated with the deterministic or semi-deterministic intelligent computing system, based on the slots data, one or more operands associated with the data processing request;

determining, using the one or more computing device processors associated with the deterministic or semi-deterministic intelligent computing system, based on the one or more operands, a data scope for the data processing request;

determining, using the one or more computing device processors associated with the deterministic or semi-deterministic intelligent computing system, based on the data scope, an execution mode for the data processing request, the execution mode comprising one or more computing languages for executing the data processing request;

generating, using the one or more computing device processors associated with the deterministic or semi-deterministic intelligent computing system, based on at least the execution mode for the data processing request, a hybrid response protocol having a structured or semi-structured data exchange format configured to preserve governance, validation, or execution integrity properties of the hybrid response protocol;

analyzing, using the one or more computing device processors associated with the deterministic or semi-deterministic intelligent computing system, based on the data exchange format, the hybrid response protocol, thereby generating a validated response protocol, the validated response protocol comprising at least the slots data or the one or more operands;

generating, using the one or more computing device processors associated with the deterministic or semi-deterministic intelligent computing system, based on the validated response protocol, intermediate output data associated with the data processing request;

analyzing, using the one or more computing device processors associated with the deterministic or semi-deterministic intelligent computing system, the intermediate output data to determine an accuracy of the intermediate output data;

implementing, using the one or more computing device processors associated with the deterministic or semi-deterministic intelligent computing system, based on the analyzing, one or more of quantitative transformation computing operations or structural or logical evaluation computing operations on at least the intermediate output data, thereby generating evaluation data associated with the intermediate output data;

implementing, using the one or more computing device processors associated with the deterministic or semi-deterministic intelligent computing system, one or more of a numerical consistency computing operation and a compliance computing operation on the evaluation data thereby generating verified output data;

transforming, using the one or more computing device processors associated with the deterministic or semi-deterministic intelligent computing system, the verified output data into one or more of natural language output data and provenance package data, the provenance package data being configured to link the natural language output data to an evidence identifier associated with the verified output data;

implementing, using the one or more computing device processors associated with the deterministic or semi-deterministic intelligent computing system, at least one of:

an archiving computing operation that stores data artifacts associated with the validated response protocol or the natural language output data, a governance computing operation that generates a first performance metric associated with the validated response protocol or the natural language output data, and an annotation computing operation, based on at least the archiving computing operation or the governance computing operation that generates a second performance metric associated with the verified output data, and initiating visualizing, using the one or more computing device processors associated with the deterministic or semi-deterministic intelligent computing system, based on the provenance package data, the natural language output data, wherein the visualizing comprises rendering, on a display computing device, answer text in response to the input query, the answer text being linked to one or more of the evidence identifier, a computation-trace identifier, and verification metadata.

* * * * *